United States Patent
Inoue

(10) Patent No.: US 12,261,648 B2
(45) Date of Patent: Mar. 25, 2025

(54) MOBILE TERMINAL TEST DEVICE AND PARAMETER SETTING METHOD THEREOF

(71) Applicant: ANRITSU CORPORATION, Kanagawa (JP)

(72) Inventor: Naoki Inoue, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 450 days.

(21) Appl. No.: 17/935,660

(22) Filed: Sep. 27, 2022

(65) Prior Publication Data

US 2023/0141053 A1    May 11, 2023

(30) Foreign Application Priority Data

Nov. 8, 2021    (JP) .................................. 2021-181909

(51) Int. Cl.
*H04B 17/15*    (2015.01)

(52) U.S. Cl.
CPC .................................... *H04B 17/15* (2015.01)

(58) Field of Classification Search
CPC ...................................................... H04B 17/15
See application file for complete search history.

(56) References Cited

U.S. PATENT DOCUMENTS

2021/0099900 A1 *   4/2021   Nakamura ............ H04L 43/045
2021/0399811 A1 *   12/2021  Endo ...................... H04B 17/15

FOREIGN PATENT DOCUMENTS

JP         2021-057814 A      4/2021

* cited by examiner

*Primary Examiner* — Yuwen Pan
*Assistant Examiner* — Swati Jain
(74) *Attorney, Agent, or Firm* — McDonald Hopkins LLC

(57) ABSTRACT

To provide a mobile terminal test device capable of efficiently testing a mobile terminal compatible with NSA while suppressing a test configuration to be small. A mobile terminal test device includes a first analysis unit 24a and a second analysis unit 24b that analyze a signal received from a mobile terminal, a first port 21a, a second port 21b, a first port 31a, and a second port 31b connected to the mobile terminal, a selection unit 22 that selects the ports to be connected to the first analysis unit 24a and the second analysis unit 24b, and a control unit 6 that performs control such that it is not possible to perform measurement setting for a measurement target of which it is not possible to simultaneously perform measurement, based on the measurement target to be measured by the set first analysis unit 24a and second analysis unit 24b.

4 Claims, 2 Drawing Sheets

MOBILE TERMINAL TEST DEVICE AND PARAMETER SETTING METHOD THEREOF

TECHNICAL FIELD

The present invention relates to a mobile terminal test device that tests a mobile terminal.

BACKGROUND ART

When a mobile terminal such as a portable phone or a data communication terminal that performs communication while moving has been developed, it is necessary to test whether or not the developed mobile terminal can perform communication normally. Therefore, a test in which a mobile terminal under test is connected to a test device that operates as a simulated base station that simulates the functions of an actual base station, communication is performed between the test device and the mobile terminal, and the content of the communication is checked is performed.

In addition, in a mobile communication system, a service of 5th Generation (5G) New Radio (NR), which is a 5G radio scheme, has started.

In 5G NR, specifications of non-standalone (NSA) in which transmission and reception are performed by a 5G line specialized in a user plane (U-Plane: user data signal), and a control plane (C-Plane: communication control signal) using a long term evolution (LTE) line and stand alone (SA) in which an operation is performed independently of 5G NR without cooperation with LTE are defined.

Patent Document 1 discloses a communication terminal measurement system that tests a mobile terminal compatible with NSA with an LTE measurement device and an NR measurement device.

RELATED ART DOCUMENT

Patent Document

[Patent Document 1] JP-A-2021-57814

DISCLOSURE OF THE INVENTION

Problem that the Invention is to Solve

In such a communication terminal measurement system, when a mobile terminal compatible with NSA is tested, it is necessary to prepare an LTE measurement device and an NR measurement device, which increases the size in the configuration of the measurement system.

The test configuration can be made smaller by integrating the LTE measurement device and the NR measurement device, but ports connected to the mobile terminal are mixed for LTE and NR. Thus, there is a concern that it is not possible to efficiently proceed the test due to a connection error and the like.

An object of the present invention is to provide a mobile terminal test device capable of efficiently testing a mobile terminal compatible with NSA while suppressing a test configuration to be small.

Means for Solving the Problem

According to the present invention, a mobile terminal test device includes two or more analysis units that analyze a signal received from a mobile terminal, ports connected to the mobile terminal, the number of the ports being more than the number of the analysis units, a selection unit that selects the port to be connected to the analysis unit, and a control unit that performs control such that it is not possible to perform measurement setting for a measurement target of which it is not possible to simultaneously perform measurement, based on the measurement target to be measured by the analysis unit.

With this configuration, control is performed so that it is not possible to perform measurement setting for the measurement target of which it is not possible to simultaneously perform the measurement. Therefore, it is possible to prevent an occurrence of a situation in which it is not possible to perform measurement due to a setting error, and to efficiently perform a test.

In the mobile terminal test device according to the present invention, the control unit performs control so that it is not possible to perform measurement setting for a measurement target of which it is not possible to simultaneously perform measurement, based on the number of the analysis units required for measurement of the measurement target.

With this configuration, control is performed so that it is not possible to perform measurement setting for a measurement target of which it is not possible to simultaneously perform measurement, based on the number of analysis units required for measurement of the measurement target. Therefore, it is possible to prevent an occurrence of a situation in which it is not possible to perform measurement due to a setting error, and to efficiently perform a test.

In the mobile terminal test device according to the present invention, the ports include a plurality of ports compatible with a first communication standard and a plurality of ports compatible with a second communication standard. The measurement target includes a measurement target measured by using the plurality of ports compatible with the second communication standard. The measurement target of which it is not possible to simultaneously perform measurement includes a measurement target using the port compatible with the first communication standard.

Further, according to the present invention, there is provided a parameter setting method of a mobile terminal test device including two or more analysis units that analyze a signal received from a mobile terminal, ports connected to the mobile terminal, the number of the ports being more than the number of the analysis units, and a selection unit that selects the port to be connected to the analysis unit. The parameter setting method includes a step of setting a measurement target to be measured by the analysis unit and a step of making it not possible to perform measurement setting for a measurement target of which it is not possible to simultaneously perform measurement, based on the measurement target.

With this configuration, control is performed so that it is not possible to perform measurement setting for the measurement target of which it is not possible to simultaneously perform the measurement. Therefore, it is possible to prevent an occurrence of a situation in which it is not possible to perform measurement due to a setting error, and to efficiently perform a test.

[Advantage of the Invention]

According to the present invention, it is possible to provide a mobile terminal test device capable of efficiently testing a mobile terminal compatible with NSA while suppressing a test configuration to be small.

BEST MODE FOR CARRYING OUT THE INVENTION

Hereinafter, a mobile terminal test device according to an embodiment of the present invention will be described in detail with reference to the drawings.

Figure 1:
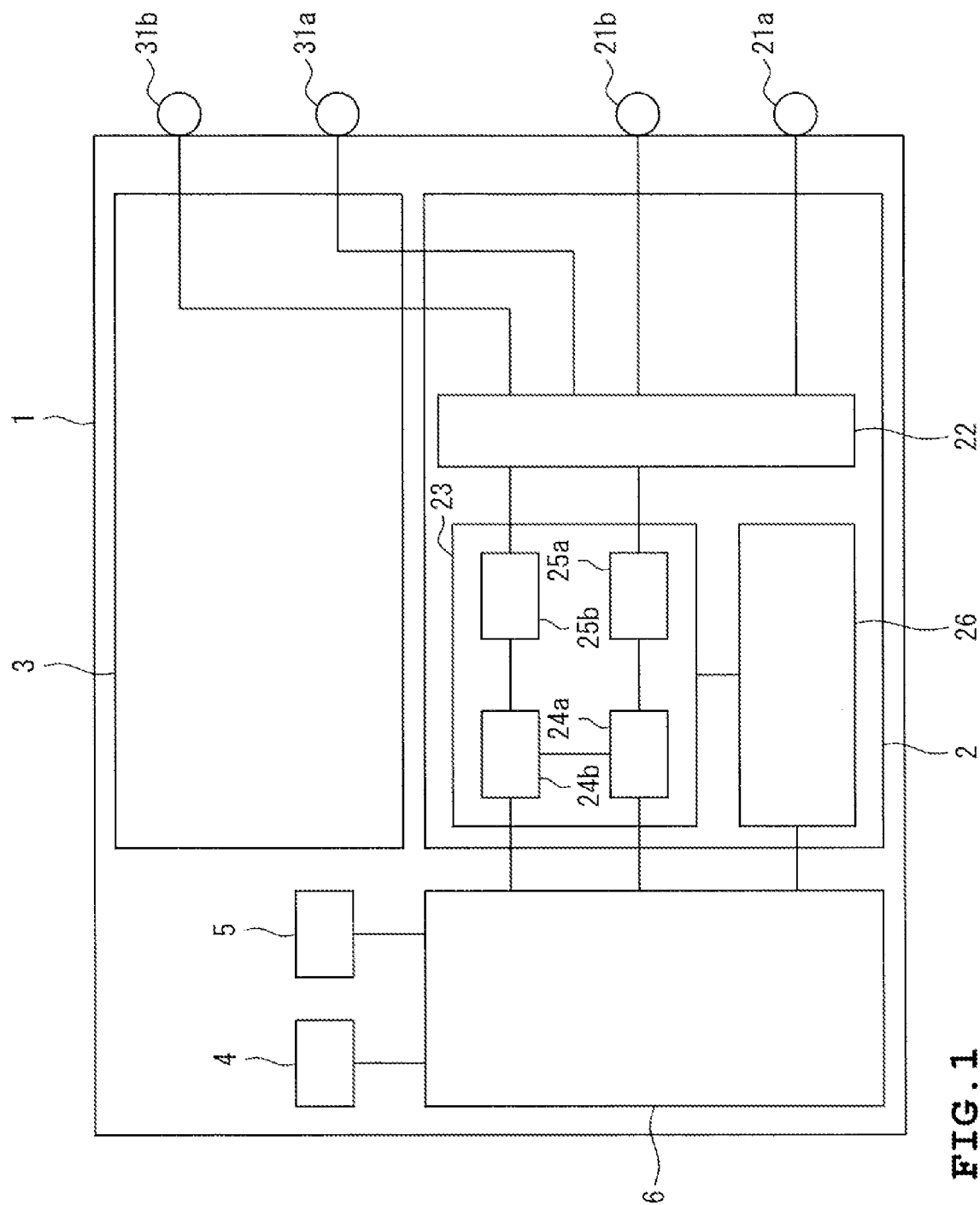
FIG. 1 is a block diagram illustrating a mobile terminal test device according to an embodiment of the present invention.

In FIG. 1, a mobile terminal test device 1 according to the embodiment of the present invention is configured to include a first slot 2, a second slot 3, a display unit 4, an operation unit 5, and a control unit 6.

The first slot 2 transmits and receives radio frequency (RF) signals to and from a mobile terminal under test. In the first slot 2, the RF signal received from the mobile terminal is measured, or a set RF signal is generated and transmitted to the mobile terminal.

The first slot 2 is configured to include a first port 21a, a second port 21b, a selection unit 22, a transmission and reception unit 23, and a simulated base station unit 26.

The first port 21a and the second port 21b are connected to the mobile terminal by cables or the like, and output an RF signal to the mobile terminal and receive an RF signal input from the mobile terminal.

The selection unit 22 connects the first port 21a and the second port 21b of the first slot 2, and a first port 31a and a second port 31b of the second slot 3 to the transmission and reception unit 23.

The transmission and reception unit 23 transmits and receives an RF signal to and from the mobile terminal. The transmission and reception unit 23 outputs an RF signal received from the mobile terminal to the simulated base station unit 26 and transmits an RF signal generated by the simulated base station unit 26 to the mobile terminal. The transmission and reception unit 23 measures the RF signal received from the mobile terminal. The transmission and reception unit 23 outputs, to the control unit 6, information on a measurement result of the RF signal received from the mobile terminal.

The transmission and reception unit 23 is configured to include a first analysis unit 24a, a second analysis unit 24b, a first hardware control unit 25a, and a second hardware control unit 25b.

The first analysis unit 24a and the second analysis unit 24b analyze the RF signal received by the port selected and connected by the selection unit 22. The first analysis unit 24a and the second analysis unit 24b can analyze RF signals for both LTE and NR.

The first hardware control unit 25a and the second hardware control unit 25b control hardware such as the transmission and reception unit 23 and the selection unit 22.

The first hardware control unit 25a and the second hardware control unit 25b, for example, control the selection unit 22 to set a connection destination of each port.

Under the control of the control unit 6, the simulated base station unit 26 transmits and receives an RF signal to and from the mobile terminal via the transmission and reception unit 23. The simulated base station unit 26 controls communication with the mobile terminal based on a command input from the control unit 6. The simulated base station unit 26 outputs the state of the communication with the mobile terminal and the like to the control unit 6.

The simulated base station unit 26 can control an LTE RF signal, an NR RF signal, and an NSA RF signal.

The second slot 3 includes the first port 31a and the second port 31b and connects the first port 31a and the second port 31b to the selection unit 22.

The first port 31a and the second port 31b are connected to the mobile terminal by cables or the like, and output an RF signal to the mobile terminal and receive an RF signal input from the mobile terminal.

Figure 2:
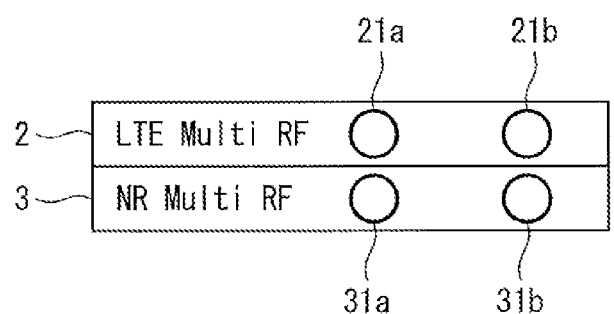
FIG. 2 is a diagram illustrating an example of a port configuration of the mobile terminal test device according to the embodiment of the present invention.

The first slot 2 and the second slot 3 are configured, for example, as illustrated in FIG. 2. In FIG. 2, the first port 21a and the second port 21b of the first slot 2 are configured as ports for inputting and outputting LTE RF signals. The first port 31a and the second port 31b of the second slot 3 are configured as ports for inputting and outputting NR RF signals.

In FIG. 1, the display unit 4 is configured by an image display device such as a liquid crystal display, and displays an image for inputting necessary information, an image indicating a state during a test, and the like.

The operation unit 5 is configured by an input device such as a keyboard, a mouse, and a touch panel, and outputs information and the like input by an operation to the control unit 6.

In accordance with an instruction input to the operation unit 5, the control unit 6 causes the display unit 4 to display a test scenario creation screen to input information required for generating the test scenario, or to generate the test scenario based on the information input to the operation unit 5 on the test scenario creation screen. In accordance with an instruction input to the operation unit 5, the control unit 6 transmits the instruction to the simulated base station unit 26 to perform a test based on the test scenario stored in a storage device or to display the state or the like during the test on the display unit 4 based on information on the state of communication with the mobile terminal, which is transmitted from the simulated base station unit 26, and the like.

Here, the mobile terminal test device 1 is configured by a computer device (not illustrated) provided with a communication module for communicating with the mobile terminal. The computer device includes a central processing unit (CPU), a read only memory (ROM), a random access memory (RAM), a hard disk device, an input and output port, and a touch panel (not illustrated).

A program for causing the computer device to function as the mobile terminal test device 1 is stored in the ROM and the hard disk device of the computer device. That is, the computer device functions as the mobile terminal test device 1 by the CPU executing the program stored in the ROM by using the RAM as a work area.

In the present embodiment, the selection unit 22 connects the first port 21a of the first slot 2 and the first port 31a of the second slot 3 to the first analysis unit 24a in the transmission and reception unit 23 in a normal state, for example. The selection unit 22 also connects the second port 21b of the first slot 2 and the second port 31b of the second slot 3 to the second analysis unit 24b in the transmission and reception unit 23.

Since the frequency characteristics of the first analysis unit 24a and the second analysis unit 24b differ depending on the ports to which the first analysis unit 24a and the second analysis unit 24b are connected, the received signals are corrected by using a correction value for each port.

The first analysis unit 24a stores the correction values for the first port 21a of the first slot 2 and the first port 31a of the second slot 3, for example. The second analysis unit 24b stores the correction values for the second port 21b of the first slot 2 and the second port 31b of the second slot 3.

When the first analysis unit 24a is connected to the second port 21b of the first slot 2 or the second port 31b of the second slot 3, the first analysis unit 24a acquires the correction value from the second analysis unit 24b and corrects the received signal.

When the second analysis unit 24b is connected to the first port 21a of the first slot 2 or the first port 31a of the second slot 3, the second analysis unit 24b acquires the correction value from the first analysis unit 24a and corrects the received signal.

As described above, since the transmission and reception unit 23 includes two analysis units being the first analysis unit 24a and the second analysis unit 24b, it is possible to analyze the RF signal from the two ports, that is, the first port 21a and the second port 21b of the first slot 2 and the first port 31a and the second port 31b of the second slot 3.

For example, when multi-input multi-out (MIMO) in an NR uplink is measured, the first port 31a and the second port 31b of the second slot 3 are respectively connected to the first analysis unit 24a and the second analysis unit 24b, and RF signals input to the first port 31a and the second port 31b are measured.

At this time, it is not possible to measure RF signals input to the first port 21a and the second port 21b of the first slot 2.

Therefore, the control unit 6 sets a measurement target when creating a test scenario for setting information on the simulated base station and the test content. The control unit 6 performs control based on the set measurement target, so that it is not possible to perform measurement setting for a measurement target of which it is not possible to simultaneously perform measurement. Here, the measurement target here is a measurement item of the test scenario stored in the storage device.

For example, when measurement of MIMO in an NR uplink is set, the control unit 6 causes the LTE measurement setting not to be performed by not displaying an interface for setting the LTE measurement setting or displaying the interface in a grayed-out manner.

As described above, in the above-described embodiment, the control unit 6 performs control so that it is not possible to perform measurement setting for a measurement target of which it is not possible to simultaneously perform measurement, based on the set measurement target.

As a result, it is possible to prevent an occurrence of a situation in which measurement setting is not made for a measurement target of which it is not possible to simultaneously perform measurement, and it is not possible to measure the measurement target due to a setting error, and thus it is possible to perform a test with high efficiency.

In addition, the control unit 6 performs control so that it is not possible to perform measurement setting for a measurement target of which it is not possible to simultaneously perform measurement, based on the number of first analysis units 24a and the second analysis units 24b required for measuring the set measurement target.

As a result, based on the number of analysis units required for measuring the set measurement target, it is possible to prevent an occurrence of a situation in which measurement setting is not made for a measurement target of which it is not possible to simultaneously perform measurement due to insufficiency in the number of analysis units required for measurement, and it is not possible to measure the measurement target due to a setting error. Thus, it is possible to perform a test with high efficiency.

In the present embodiment, an example of an integrated mobile terminal test device has been described. The present invention is not limited to this. For example, the functions of the control unit 6 may be realized by a program operating on a personal computer, and the personal computer may control the first slot 2, the second slot 3, and the like.

Hitherto, the embodiment of the present invention has been disclosed, but it is clear that changes can be made by those skilled in the art without departing from the scope of the present invention. All such modifications and equivalents are intended to be included in the claims as follows.

DESCRIPTION OF REFERENCE NUMERALS AND SIGNS

1 MOBILE TERMINAL TEST DEVICE
2 FIRST SLOT
3 SECOND SLOT
6 CONTROL UNIT
21a FIRST PORT (PORT)
21b SECOND PORT (PORT)
22 SELECTION UNIT
23 TRANSMISSION AND RECEPTION UNIT
24a FIRST ANALYSIS UNIT (ANALYSIS UNIT)
24b SECOND ANALYSIS UNIT (ANALYSIS UNIT)
31a FIRST PORT (PORT)
31b SECOND PORT (PORT)

What is claimed is:

1. A mobile terminal test device comprising:
two or more analysis units that analyze a signal received from a mobile terminal;
ports connected to the mobile terminal, the number of the ports being more than the number of the analysis units;
a selection unit that selects the port to be connected to the analysis unit; and
a control unit that performs control so that it is not possible to perform measurement setting for a measurement target of which it is not possible to simultaneously perform measurement, based on the measurement target to be measured by the analysis unit.

2. The mobile terminal test device according to claim 1, wherein
the control unit performs control so that it is not possible to perform measurement setting for a measurement target of which it is not possible to simultaneously perform measurement, based on the number of the analysis units required for measurement of the measurement target.

3. The mobile terminal test device according to claim 1, wherein
the ports include a plurality of ports compatible with a first communication standard and a plurality of ports compatible with a second communication standard, and
the measurement target includes a measurement target that is measured by using the plurality of ports compatible with the second communication standard, and
the measurement target of which it is not possible to simultaneously perform the measurement includes a measurement target using the port compatible with the first communication standard.

4. A parameter setting method of a mobile terminal test device including two or more analysis units that analyze a signal received from a mobile terminal, ports connected to the mobile terminal, the number of the ports being more than the number of the analysis units, and a selection unit that selects the port to be connected to the analysis unit, the method comprising:
a step of setting a measurement target to be measured by the analysis unit; and a step of making it not possible to perform measurement setting for a measurement target of which it is not possible to simultaneously perform measurement, based on the measurement target.

\* \* \* \* \*